(12) United States Patent
Wang et al.

(10) Patent No.: US 10,444,399 B2
(45) Date of Patent: Oct. 15, 2019

(54) MULTIAXIAL WELL LOGGING INSTRUMENT RESPONSE IN DIPPING AND CROSSBEDDED FORMATIONS

(71) Applicant: Schlumberger Technology Corporation, Sugar Land, TX (US)

(72) Inventors: Gong Li Wang, Sugar Land, TX (US); Thomas Barber, Houston, TX (US); Peter Wu, Missouri City, TX (US); David F. Allen, Katy, TX (US); Aria Abubakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 842 days.

(21) Appl. No.: 14/669,683

(22) Filed: Mar. 26, 2015

(65) Prior Publication Data

US 2015/0276966 A1 Oct. 1, 2015

Related U.S. Application Data

(60) Provisional application No. 61/972,345, filed on Mar. 30, 2014.

(51) Int. Cl.
*G01V 3/38* (2006.01)
*G01V 3/28* (2006.01)

(52) U.S. Cl.
CPC . *G01V 3/38* (2013.01); *G01V 3/28* (2013.01)

(58) Field of Classification Search
CPC .......... G01V 3/20; G01V 3/38; G01V 99/005; G01V 3/28

(Continued)

(56) References Cited

U.S. PATENT DOCUMENTS 6,044,325 A 3/2000 Chakravarthy et al.
6,798,208 B2 9/2004 Omeragic
(Continued)

FOREIGN PATENT DOCUMENTS

WO 2013191749 A1 12/2013

OTHER PUBLICATIONS

Anderson:, et al., "The effect of cressbedding anisotropy on induction tool response", Transactions of the SPWLA 39th Annual Logging Symposium, Paper B, 1998, 14 pages.
(Continued)

*Primary Examiner* — Eunhee Kim (57) ABSTRACT

A method for determining resistivity of subsurface formations includes generating an initial model of the formations from multiaxial electromagnetic transimpedance measurements, the model comprising values of vertical resistivity, horizontal resistivity, crossbed dip, crossbed azimuth, and bedding dip and azimuth. Expected measurements generated from the initial model measurements are decomposed into ordinary and extraordinary components. The actual tool measurements are compared to the summation of the expected decomposed measurement components. The initial model is adjusted, the expected decomposed components are recalculated and the foregoing are repeated until the difference between the actual tool measurements and the summation of the expected decomposed components falls below a selected threshold.

18 Claims, 7 Drawing Sheets

(58) Field of Classification Search
USPC .................................................... 703/2, 10
See application file for complete search history.

(56) References Cited

U.S. PATENT DOCUMENTS

| | | | |
|---|---|---|---|
| 6,924,646 | B2 | 8/2005 | Omeragic |
| 6,937,021 | B2 | 8/2005 | Rosthal |
| 2003/0028324 | A1 | 2/2003 | Xiao et al. |
| 2004/0154831 | A1* | 8/2004 | Seydoux .............. E21B 7/04 175/24 |
| 2006/0161350 | A1 | 7/2006 | Wang et al. |
| 2009/0167309 | A1 | 7/2009 | Homan |
| 2011/0254552 | A1* | 10/2011 | Wu .................. G01V 3/28 324/339 |
| 2012/0166086 | A1 | 6/2012 | Zhong et al. |
| 2014/0372040 | A1* | 12/2014 | Wu .................. G01V 3/28 702/7 |

OTHER PUBLICATIONS

Barber, et al., "Determining Formation Resistivity Anisotrophy in the Presence of Invasion", SPE 90526—SPE Annual Technical Conference & Exhibition, Houston, TX, Sep. 26-29, 2004, pp. 1-25.

Chang, et al., "Multiple expansion technique for electromagnetic scattering by buried objects", 1981, Electromagnetics, Issue: 1, pp. 73-89.

Davydycheva, et al., "An Efficient Finite-Difference Scheme for Electromagnetic Logging in 3D Anisotropic Inhomogeneous Media", 2003, Geophysics, vol. 68, No. 5, pp. 1525-1536.

Eroglu, et al., "Dyadic Green's functions for multi-latered uniaxially anisotropic media with arbitrarily oriented optic axes", 2011, IET Microwaves, Antennas, & Propagation, vol. 5, Issue: 15, pp. 1779-1788.

Hou, et al., "Real-time borehole correction for a new multicomponenet array induction logging in OBM wells", SPWLA 53rd Annual Logging Symposium, Jun. 16-20, 2012, 16 pages.

Kriegshauser, et al., "A new multicomponent induction logging tool to resolve anisotropic formations", SPWLA 41st Annual Logging Symposium, Jun. 4-7, 2000, 14 pages.

Lee, et al., "Dyadic Green's function for layered anisotropic medium", 1983, Electromagnetics, Issue: 3, pp. 111-130.

International Search Report for corresponding International App No. PCT/US2015/022906 dated Jun. 30, 2015, 3 pages.

Written Opinion for corresponding International App No. PCT/US2015/022906 dated Jun. 30, 2015, 11 pages.

Rosthal, et al., "Field test results of an experimental fully-triaxial induction tool", SPWL 44th Annual Logging Symposium, Jun. 22-25, 2003, 14 pages.

Tsang, et al., "Microwave thermal emission from a stratified medium with nonuniform temperature distribution", 1975, Journal of Applied Physics, No. 46, pp. 5127-5133.

Wang, et al., "Determining anisotropic resititivity at any relative dip using a multiarray triaxial induction tool", SPE 103113-SPE Annual Technical Conference and Exhibition, San Antonio, Texas, Sep. 24-27, 2006, 13 pages.

Zhang, et al., "Application of novel basis functions in a hybrid method simulation of the response of induction logging in axisymmetrical stratified media", Radio Science, Jan.-Feb. 1999, vol. 34, No. 1, pp. 19-26.

EP Application No. 15 772 508.6, EP Exam Report dated Dec. 8, 2017, EP Suppl. Search Report dated Nov. 29, 2017 (10 pages).

Hanming Wang, Sofia Davydycheva, Jinjuan Zhou, Mark Frey, Tom Barber, Aria Abubakar, and Tarek Habashy (2008) Sensitivity study and inversion of the fully-triaxial induction logging in cross-bedded anisotropic formation. SEG Technical Program Expanded Abstracts 2008: pp. 284-288. https://doi.org/10.1190/1.3054806 (5 pages).

S Gianzero et al: "The Response Of A Triaxial Induction Sonde In A Biaxial Anisotropic Medium", Petrophysics, Mar. 1, 2002 (Mar. 1, 2002), pp. 172-184, XP055429725 (13 pages).

Michael Zhdanov et al: "Foundations of Tensor Induction Well-Logging", Petrophysics, vol. 42, No. 6, Jan. 1, 2001 (Jan. 1, 2001), pp. 588-610, XP055207299 (23 pages).

* cited by examiner

MULTIAXIAL WELL LOGGING INSTRUMENT RESPONSE IN DIPPING AND CROSSBEDDED FORMATIONS

CROSS-REFERENCE TO RELATED APPLICATIONS

Priority is claimed from U.S. Provisional Application No. 61/972,345 filed on Mar. 30, 2014 entitled, "Triaxial Tool response in Dipping and Crossbedded Formations," the contents of which are herein incorporated for all purposes.

STATEMENT REGARDING FEDERALLY SPONSORED RESEARCH OR DEVELOPMENT

Not applicable.

BACKGROUND

The present disclosure relates generally to the field of electromagnetic well logging for formation evaluation and characterization. More particularly, the disclosure relates to using multiaxial electromagnetic well logging measurements to resolve formation resistivity anisotropy and formation structures such as cross bedding.

Well logging instruments known in the art include electromagnetic induction and electromagnetic propagation (resistivity) instruments. Earlier well logging instruments were run into a wellbore on an armored electrical cable ("wireline") after the wellbore had been drilled. More recent versions of such wireline instrument are still used extensively. As the demand for information while drilling a wellbore continued to increase, measurement-while-drilling (MWD) tools and logging-while-drilling (LWD) tools have been developed to meet such demands. MWD tools typically provide drilling parameter information such as weight on the bit, torque, temperature, pressure, direction, and inclination. LWD tools typically provide formation evaluation measurements (measurements of physical parameters) such as resistivity, porosity, NMR relaxation time distributions, among other measurements. MWD and LWD tools often have features in common with wireline tools (e.g., transmitting and receiving antennas, sensors, etc.).

The use of electromagnetic measurements in applications, such as logging while drilling (LWD) and wireline logging applications is well known. LWD electromagnetic measurement techniques may be used to determine subsurface formation resistivity, which, along with formation porosity measurements, may be used to indicate the presence of hydrocarbons in certain formations. Moreover, azimuthally sensitive directional resistivity measurements are known to be used in "pay-zone" steering applications, to provide information upon which wellbore trajectory steering decisions may be made.

Electromagnetic induction or propagation measurements may be inverted using a formation model to obtain various formation parameters, for example and without limitation vertical resistivity, horizontal resistivity, distance to a remote bed, resistivity of the remote bed, dip angle, and the like. One challenge in using directional electromagnetic resistivity measurements, is obtaining a sufficient quantity of data to perform a reliable inversion. The actual formation structure is frequently much more complex than the formation models used in the inversion. The use of full tensor measurements may enable a full tensor of the formation properties to be obtained.

Figure 1:
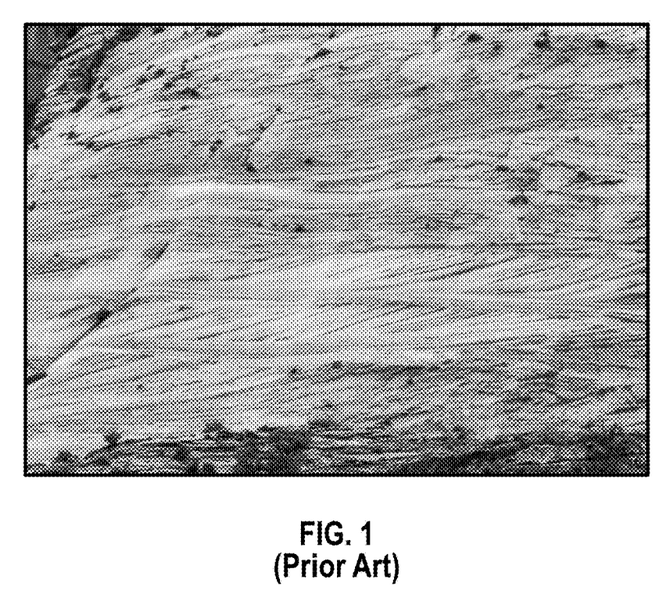
FIG. 1 shows an example of a cross bedded formation.

Geologically, cross bedding is understood as referring to sedimentary formations wherein each bed is made up of thin layers inclined with respect to the bedding plane. For example, FIG. 1 shows a photograph of a cross bedded formation taken of the Navajo Sandstone formations in the Zion National Park, Utah, USA.

In the foregoing example, thin layers may appear in measurements as resistivity anisotropy when their thickness is below the instrument's axial resolution. As can be appreciated, cross bedding can form in any environment with a flowing fluid where mobile sediments are carried along the upstream side, then fall down and deposit on the downstream side. Cross bedding phenomena have been found in a variety of sedimentary environments such as fluvial deposits, tidal areas, shallow marine, aeolian dunes, and other environments.

Triaxial induction tools are known in the art to perform electromagnetic (resistivity) logging of formations. More recent triaxial induction tools may be capable of providing full tensor measurements. With full tensor measurements a user may be able to determine not only the formation resistivity, but also the resistivity anisotropy and dip of certain formations. The ability to determine formation dip with triaxial induction measurements relies on their sensitivity to both dip and orientation of resistivity anisotropy. In transversely isotropic formations where the orientation of the resistivity anisotropy is aligned with the bedding dip, the triaxial induction dip is simply the bedding dip. However, when cross bedding develops in some beds the triaxial induction dip becomes a mixture of both the bedding dip and cross bed dip.

The use of computer models is one way to simulate tool response, and simulated too response may be used for interpretation in order to interpret instrument measurement data to obtain formation properties. As an example, early work on modeling triaxial induction tools in the presence of cross bedding is described in, Anderson et al., *The Effect of Cross bedding Anisotropy On Induction Tool Response*, SPWLA 39th Annual Logging Symposium, Paper B. However, the foregoing paper does not explicitly describe how the modeling may be applied in a well of arbitrary dip (the paper discloses vertical wells). Further, the forgoing publication does not explicitly discuss decomposition of electromagnetic fields.

SUMMARY

A method for determining resistivity of subsurface formations includes inputting measurements of multiaxial transimpedance resulting from inducing a multiaxial electromagnetic field to a computer. The measurements are made at multiple locations axially spaced from a position where the multiaxial electromagnetic field was induced. The method further includes generating an initial model of the formations from the measurements. The model includes values of vertical resistivity, horizontal resistivity, crossbed dip, crossbed azimuth, and bedding dip and azimuth. In the computer, expected multiaxial transimpedance responses are calculated from the initial model. The input measurements are compared to the expected transimpedance responses to calculate a difference therebetween. The initial model is adjusted and the expected transimpedance responses recalculated until the difference falls below a selected threshold. The adjusted model is displayed.

A method for well logging includes moving a well logging instrument having at least one multiaxial electromagnetic transmitter and at least one multiaxial electromagnetic receiver spaced apart therefrom along a wellbore traversing subsurface formations. Transimpedances are measured at the at least one multiaxial receiver resulting from passing electric current through the at least one multiaxial transmitter. An initial model of the formations from the transimpedance measurements is generated. The model includes values of vertical resistivity, horizontal resistivity, crossbed dip, crossbed azimuth, and bedding dip and azimuth. Expected transimpedance responses are calculated from the initial model. The input measurements are compared to the expected calculated transimpedance responses to calculate a difference between them. The initial model is adjusted and the expected transimpedance responses are recalculated, repetitively until the difference falls below a selected threshold. The adjusted model is displayed.

A system for well logging includes a multiaxial electromagnetic well logging instrument having at least one multiaxial electromagnetic transmitter and at least one spaced apart multiaxial electromagnetic receiver. The system further includes a means for energizing the at least one multiaxial electromagnetic transmitter, a means for measuring transimpedance using the multiaxial electromagnetic receiver, and a processor having instructions programmed thereon to perform actions. The actions performed by the processor include accepting detected voltages as input and generating an initial model of the formations from the measurements. The model includes values of vertical resistivity, horizontal resistivity, crossbed dip, crossbed azimuth, and bedding dip and azimuth. The processor also calculates expected transimpedance responses from the initial model, compares the detected voltages made at a plurality of axial spacings to the expected transimpedance responses to calculate a difference between them, adjusts the initial model and recalculates the difference until the difference falls below a selected threshold, and displays the adjusted model.

DETAILED DESCRIPTION

Figure 2:
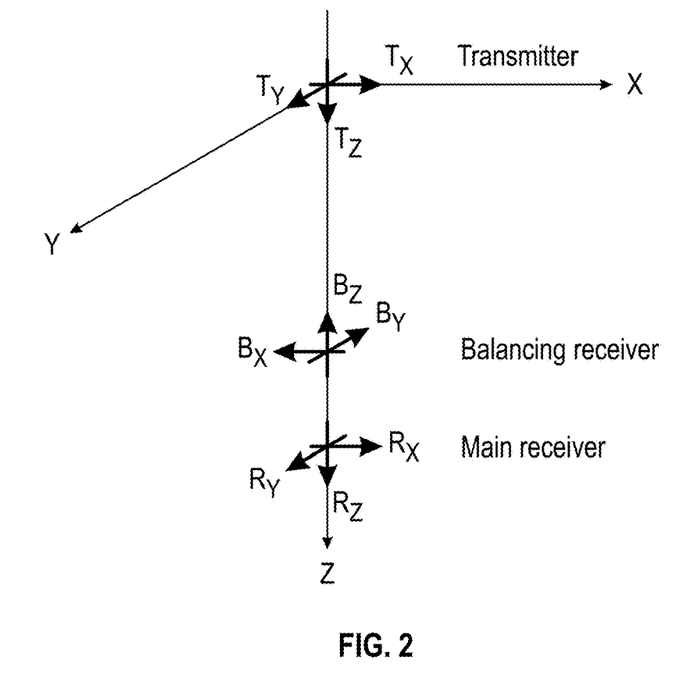
FIG. 2 shows an example multiaxial transmitter and receiver arrangement.

A tri-axial induction well logging instrument such as one sold under the trademark RT SCANNER, which is a trademark of Schlumberger Technology Corporation, Sugar Land, Tex., measures nine-component, mutually orthogonal transimpedance coupling voltages (Vm(i,j,k), i,j=x,y,z) which can be converted to apparent conductivity tensors (σm(i,j,k), i,j=x,y,z) at multiple longitudinal spacings from a transmitter, each spacing represented by an index k. The relation between Vm and σm is Vm=K ○ σm, where K is a constant sensitivity-factor matrix and ○ is a symbol for a Hadamard product, or element-wise matrix product. FIG. 2 illustrates an example of one such tri-axial measurement sensor arrangement. The term "axis" as used herein refers to the longitudinal axis of a coil-type antenna, which is coincident with its dipole moment direction. It should be understood that types of antennas other than coils may be used; the analysis and description that follows is based in terms of dipole moment direction of a coil type antenna, but that is not a limit on the scope of electromagnetic well logging instrument configuration that may be used in accordance with the present disclosure.

The above described transimpedance coupling voltage measurements may be obtained in the frequency domain by operating a multiaxial transmitter (in this case a mutually orthogonal three-axis transmitter Tx, Ty, Tz, wherein the Z axis is coincident with the longitudinal axis of the logging instrument) with a continuous wave (CW) of one or more discrete frequencies selected to enhance the signal-to-noise ratio. However, measurements of the same information content may also be obtained and used from time domain signals through a Fourier decomposition process. This is a well-known physics principle of frequency-time duality. Voltages are detected in corresponding receiver arrays which may include main receiver coils having corresponding dipole moment direction (Rx, Ry, Rz) to the transmitter and corresponding balancing or "bucking" coils series connected thereto (Bx, By, Bz). A plurality of such receiver arrays may be disposed at different selected longitudinal distances from the transmitter. Formation properties, such as horizontal and vertical conductivities (σh, σv), bedding dip angle (θ) and bedding dip azimuthal direction (φ), cross bed dip angle α and cross bed azimuthal direction β, as well as borehole/tool properties, such as mud conductivity (σmud), hole diameter (hd), tool eccentering distance (decc), tool eccentering azimuthal angle (ψ), all affect the apparent conductivity tensors. It will be appreciated by those skilled in the art that the voltage measurement of interest is that which is exactly out of phase with the current amplitude in the transmitter, that is, one caused by induction of eddy currents in the formations (which are 90 degrees out of phase with the transmitter current) and subsequently induced in the receiver(s) by the eddy currents (which are 90 degrees out of phase with the eddy currents). Methods and apparatus for making such measurements and the principles thereof are well known in the art.

While the example shown in FIG. 2, and its embodiment in instruments such as the RT SCANNER instrument described above uses three, mutually orthogonal magnetic dipole antennas (in the form of wire coils) for each transmitter and receiver (both main and balancing or "bucking" receivers), such arrangement is not a limitation on the scope of the present disclosure. It should be clearly understood that any arrangement and number of dipole antennas may also be used if they have dipole moment directions and numbers of dipole moment directions such that the nine component tensor measurements described above may be resolved. Accordingly, use of the term "multiaxial" measurements is intended to include within its scope any arrangement of transmitters and receivers that is capable of obtaining measurements that can be directly used to obtain the 9 component tensor measurements or can be converted such as by trigonometric rotation into such tensor measurements.

In the present description, a particular voltage measurement may be referred to by a two-letter descriptor that identifies the transmitter dipole moment axis and the receiver dipole moment axis for which the particular measurement is made. In the example shown in FIG. 2, there are, therefore, 9 possible measurements each representing one transmitter dipole moment axis and one receiver dipole moment axis. Such descriptors will be used, for example, in example modeling results shown in FIGS. 5 and 6 to be described in more detail below.

Figure 3:
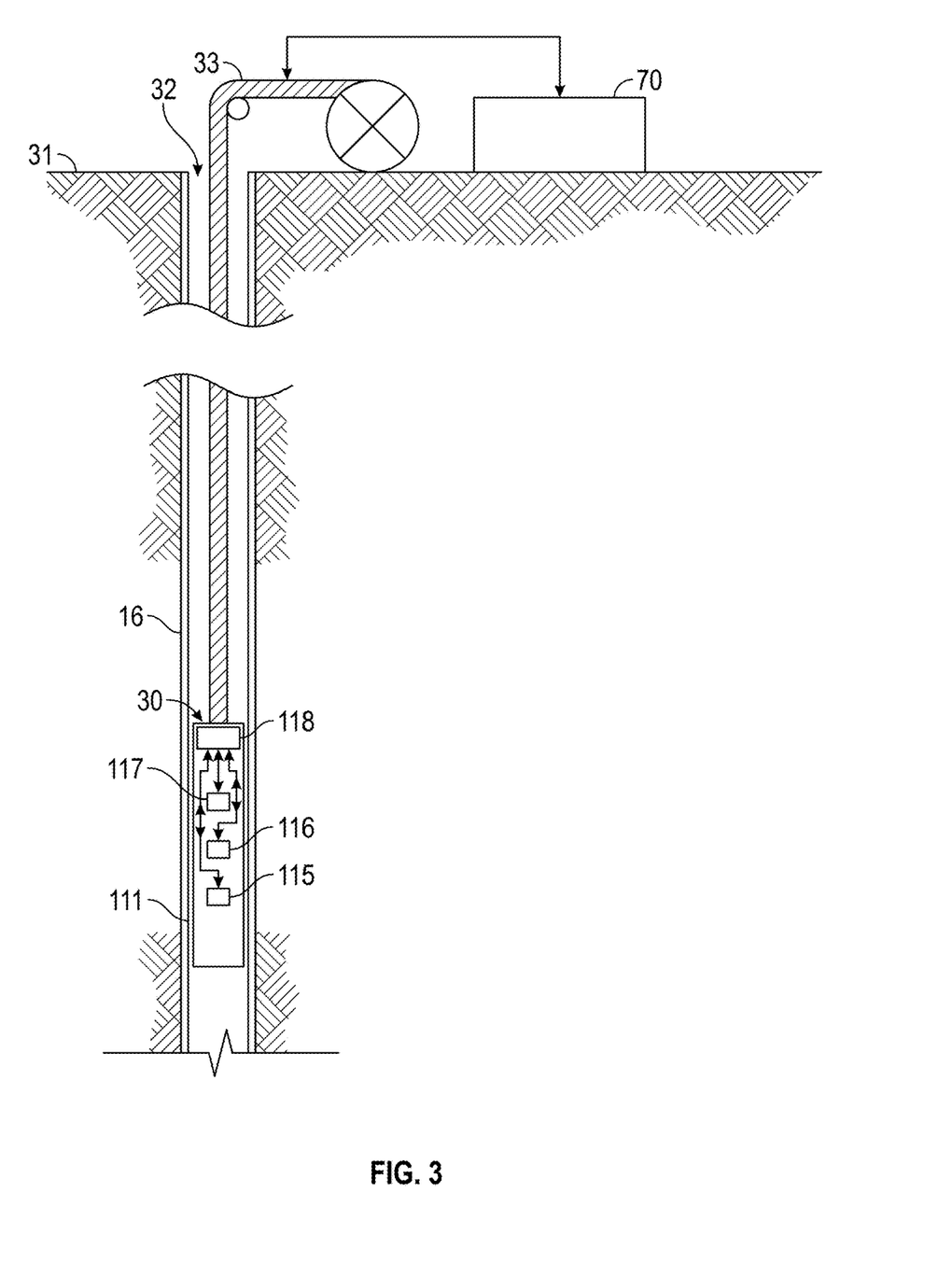
FIG. 3 shows an example wireline conveyed multiaxial electromagnetic induction well logging instrument.

FIG. 3 shows an example multi-axial electromagnetic well logging instrument 30. The measurement components of the instrument 30 may be disposed in a housing 111 shaped and sealed to be moved along the interior of a wellbore 32. The well logging instrument 30 may, in a form hereof, be the RT SCANNER instrument described above.

The instrument housing 111 may contain at least one multi-axial electromagnetic transmitter 115, and two or more multi-axial electromagnetic receivers 116, 117 each disposed at different axial spacings from the transmitter 115. The transmitter 115, when activated, may emit a continuous wave electromagnetic field at one or more selected frequencies. Shielding (not shown) may be applied over the transmitter 115 and the receivers 116, 117 to protect the antenna coils which are deployed near the outer layer of the tool. The detectors 116, 117 may be multi-axis wire coils each coupled to a respective receiver circuit (not shown separately). Thus, detected electromagnetic energy may also be characterized at each of a plurality of distances from the transmitter 115.

The instrument housing 111 maybe coupled to an armored electrical cable 33 that may be extended into and retracted from the wellbore 32. The wellbore 32 may or may not include metal pipe or casing 16 therein. The cable 33 conducts electrical power to operate the instrument 30 from a surface 31 deployed recording system 70, and signals from the receivers 116, 117 may be processed by suitable circuitry 118 for transmission along the cable 33 to the recording system 70. The recording system 70 may include a computer as will be explained below for analysis of the detected signals as well as devices for recording the signals communicated along the cable 33 from the instrument 30 with respect to depth and/or time.

The well logging tool described above can also be used, for example, in logging-while-drilling ("LWD") equipment. A non-limiting example of a logging while drilling multi-axial logging instrument is sold under the trademark PERISCOPE, which is also a trademark of Schlumberger Technology Corporation. As shown, for example, in FIG. 4, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. Alternatively, the drill string 214 and drill bit 216 may be rotated from the surface by a "top drive" type of drilling rig.

Figure 4:
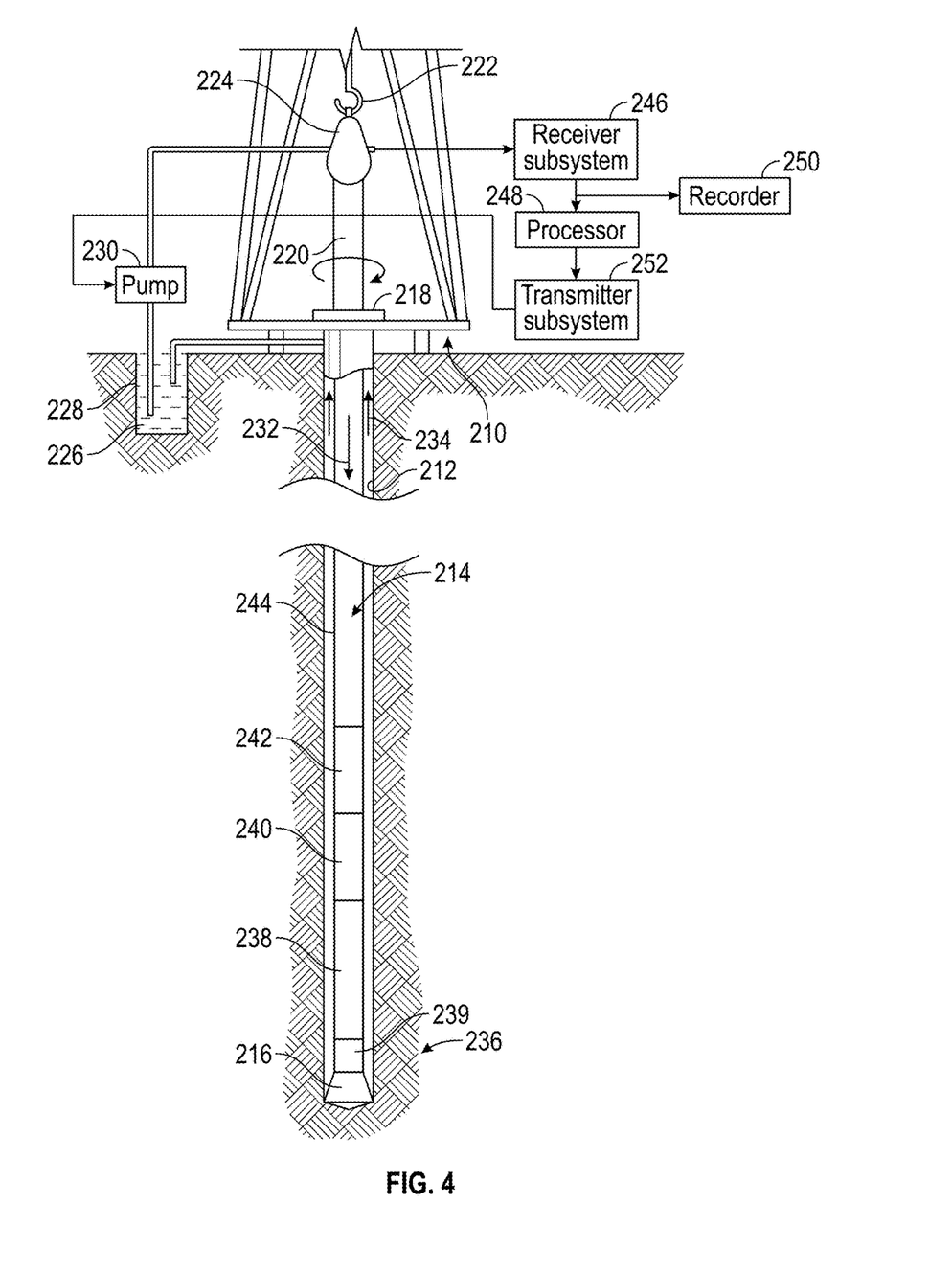
FIG. 4 shows an example logging while drilling (LWD) conveyed multiaxial electromagnetic well logging instrument.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214, preferably near the drill bit 216. The BHA 236 may include subassemblies for making measurements, processing and storing information and for communicating with the Earth's surface. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions.

In the arrangement shown in FIG. 4, the components of multi-axial electromagnetic propagation well logging instrument may be located in the drill collar section 240 above the stabilizer collar 238. Such components could, if desired, be located closer to or farther from the drill bit 216, such as, for example, in either stabilizer collar section 238 or 242 or the drill collar section 244. As will be familiar to those skilled in the art, instead of transimpedance voltage coupling measurements along the 9 possible directional combinations of the instrument shown in FIG. 2, equivalent phase shift and amplitude attenuation of an electromagnetic wave induced by a multiaxial transmitter may be measured by the instrument in FIG. 4. The phase shift and amplitude attenuation measurements may be converted to apparent conductivities using methods known in the art.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 may also include conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. The data may also be stored in the instrument and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

The BHA 236 may also include a directional drilling device 239. The directional drilling device 239 enables a drilling unit (i.e., all the above described equipment) operator to adjust the trajectory of the well being drilled by rotating the drill bit 216 and lengthening the drill string 216. In some embodiments, the directional drilling device 239 may be used to cause the well to follow a trajectory or path along the "bedding plane" (the geologic layering) of a formation having fractures therein. The directional drilling device 239 may be, in some embodiments, a "steerable drilling motor" or a "rotary steerable directional drilling system", both of which are well known in the art and enable well path direction changes without the need to remove the drill string 216 from the well.

While the description that follows is based on measurements made from a tool such as the RTSCANNER instrument described with reference to FIG. 3 or the PERISCOPE instrument described with reference to FIG. 4 in which each of the transmitter and receivers comprises mutually orthogonal induction coils with one coil being aligned with the instrument's longitudinal axis, it is to be understood that for purposes of defining the scope of the disclosure, any induction or electromagnetic propagation well logging instrument with multi-axial transmitter(s) and receiver(s) having magnetic dipole axes along other directions and in other than three magnetic dipole axis elements (e.g., coils) per transmitter or receiver may be used provided that for each such transmitter and receiver it is possible to resolve three mutually orthogonal components of the transmitted electromagnetic field and the received electromagnetic field and where such resolved components are susceptible to either or both mechanical (physically embodied) or mathematical rotation to any selected coordinate system, e.g., Cartesian or cylindrical. For purposes of the present disclosure, the component tensor measurements may be described as "transimpedance" measurements, wherein an EM field is induced in the formations either by generating a time varying magnetic or electric field along multiple magnetic or electric dipole axes, and properties of the induced electromagnetic field are measured at a plurality of axial spacings from the position of inducing the EM field. The properties may include voltage induced in a receiver or change in amplitude and/or phase of the EM field at a plurality of axial spacings from the point of inducing, again along a plurality of different electric or magnetic dipole axes.

Having explained example instruments that may be used to make electromagnetic measurements for use according to the present disclosure, example methods according to the present disclosure will now be explained.

With respect to electromagnetic measurements from a well logging instrument, the electromagnetic field may be decomposed into two modes in transversely isotropic media. The decomposition may be dependent on material properties of the surrounding wellbore and formations, but is independent of the electromagnetic field source type and orientation. The importance of such independence is that the reflection and transmission matrices are also independent of the field source type and orientation, and therefore repetitive computation can be avoided. In a formation with cross bedding, the situation becomes more complicated due to the inclination of the optical axis (the principal axis associated with vertical resistivity Rv) of the conductivity tensor. Some existing techniques present an explicit decomposition in a simple situation, i.e. cases where the optical axis is tilted relative to a line normal to the bedding plane, but not rotated in the bedding plane. Another previously used technique has shown that the same decomposition also holds for general cases.

In accordance with aspects of the present disclosure, it is possible to take advantage of the aforementioned explicit decomposition to represent the electromagnetic field in cross bedded formations. Beyond that, the generalized reflection/transmission method may be used to determine the electromagnetic field in multi-layered formations. The electromagnetic fields may be expressed in terms of a 2D Fourier transform. Further, a numerical scheme will be presented that may work for both vertical and deviated wells. Validation against existing methods used in typical situations will be presented as well.

1. Description of Methodology

The frequency domain vector-wave equation for an electric field E in an anisotropic medium may be expressed as:

$$\nabla \times \nabla \times E - i\omega\mu_0 \bar{\sigma} \cdot E = -\nabla \times M + i\omega\mu_0 J \tag{0}$$

In Eq. (1), the electromagnetic field source may be a magnetic current, designated by M, or an electric current source, designated by J. Without loss of generality, the following description will focus on the electromagnetic field excited by a magnetic current source M. The formation is assumed to be non-magnetic, therefore $\mu = \mu_0$; $\omega = 2\pi f$ is the angular frequency of the transmitter current, with $f$ being its frequency; i is the imaginary unit, $i = \sqrt{-1}$; and the time dependence $e^{-i\omega t}$. The interest is in the electromagnetic field in a multi-layered formation. The conductivity $\bar{\sigma}$ of any bed therein may be given by the expression:

$$\bar{\sigma} = \bar{R}_\beta^t \bar{R}_\alpha^t \begin{bmatrix} \sigma_h & & \\ & \sigma_h & \\ & & \sigma_v \end{bmatrix} \bar{R}_\alpha \bar{R}_\beta \tag{0}$$

In the above Eq. (2), $\sigma_h$ and $\sigma_v$ are horizontal and vertical conductivities of the bed, respectively. $\bar{R}_\alpha$ and $\bar{R}_\beta$ are the rotation matrices associated with the cross bed dip $\alpha$ and azimuth $\beta$ of the bed, respectively:

$$\bar{R}_\alpha = \begin{bmatrix} \cos\alpha & 0 & \sin\alpha \\ 0 & 1 & 0 \\ -\sin\alpha & 0 & \cos\alpha \end{bmatrix} \tag{0}$$

$$\bar{R}_\beta = \begin{bmatrix} \cos\beta & \sin\beta & 0 \\ -\sin\beta & \cos\beta & 0 \\ 0 & 0 & 1 \end{bmatrix} \tag{0}$$

Note that for the sake of clarity, $\sigma_h$, $\sigma_v$, $\alpha$ and $\beta$ are not indexed. It is noted that they are not necessarily constant across an entire formation, and can change from bed to bed. However, they are assumed to be invariant within each bed in all directions.

In a homogeneous medium, the electric field can be expressed as follows:

$$E(r) = \int_{-\infty}^{\infty} \int_{-\infty}^{\infty} dk_x dk_y (\hat{h}_o^\pm, \hat{h}_e^\pm) b_{\eta,0}^\pm e^{iK_z^\pm (z-z')} e^{ik_s \cdot (r_s - r_s')} \tag{0}$$

where $r_s = x\hat{x} + y\hat{y}$ and $r'_s = x'\hat{x} + y'\hat{y}$ are the transverse coordinates (in the bedding coordinates) of the field and source points, respectively; Z and Z' are their axial (position along the normal to the bedding plane in the bedding coordinates) coordinates, respectively; and $k_s = k_x\hat{x} + k_y\hat{y}$ designates the transverse wave numbers. From this point on, all the computations will be conducted in the bedding coordinates unless otherwise redefined.

$K_z^\pm$ includes 2 axial wave numbers, $K_z^\pm = \text{diag}(k_{z,o}^\pm, k_{z,e}^\pm)$ where subscripts O and e denote ordinary and extraordinary modes, respectively. $k_{z,o}^\pm$ and $k_{z,e}^\pm$ may be found by solving a quartic equation. The plus and minus signs designate up-going and down-going waves respectively. $b_{\eta,0}^\pm$ is the field magnitude determined by the source, as shown below:

$$b_{\eta,0}^\pm = -\frac{iI_m l}{4\pi^2} \begin{pmatrix} +\lambda_o^\pm \langle \hat{h}_o^\pm, s_{\eta,o}^\pm \rangle \\ -\lambda_e^\pm \langle \hat{h}_e^\pm, s_{\eta,e}^\pm \rangle \end{pmatrix}. \tag{0}$$

In Eq. (0), $s_{\eta,o}^\pm = s_\eta|_{k_z = k_{z,o}^\pm}$ and $s_{\eta,e}^\pm = s_\eta|_{k_z = k_{z,e}^\pm}$ are the source terms in the spectral domain. The symbol $\eta$ represents the source orientation, $\eta = x,y,z$. It is found that:

$$s_x = ik_z\hat{y} - ik_y\hat{z} \tag{0}$$

$$s_y = ik_x\hat{z} - ik_z\hat{x} \tag{0}$$

$$s_z = ik_y\hat{x} - ik_x\hat{y} \tag{0}$$

The above correspond to a magnetic dipole directed in x-, y- and z-directions, respectively. Unit vectors $\hat{h}_o^\pm$ and $\hat{h}_e^\pm$ are the ordinary and extraordinary modes of the electric field, and $\lambda_o^\pm$ and $\lambda_e^\pm$ are their associated constants:

$$\hat{h}_o^\pm = \frac{\hat{z}'' \times k_o^\pm}{|\hat{z}'' \times k_o^\pm|} \tag{0}$$

$$\hat{h}_e^\pm = \frac{h_e^\pm}{|h_e^\pm|}, \quad h_e^\pm = \overline{\sigma} \cdot k_e^\pm \times \frac{\hat{z}'' \times k_e^\pm}{|\hat{z}'' \times k_e^\pm|} \tag{0}$$

$$\lambda_o^\pm = -\frac{1}{2k_{z,o}^\pm} \tag{0}$$

$$\lambda_e^\pm = -\frac{1}{(k_{z,e}^\pm - k_{z,e}^\mp)} \frac{k_h^2 + k_v^2 - (k_\rho^2 + k_{z,e}^{\pm 2})}{i\omega\mu_0\sigma_{zz}} \tag{0}$$

In the above expression, $k_o^\pm$ and $k_e^\pm$ are the wave vectors of the ordinary and extraordinary modes, respectively, which are given by the expressions:

$$k_o^\pm = k_x\hat{x} + k_y\hat{y} + k_{z,o}^\pm\hat{z} \tag{0}$$

$$k_e^\pm = k_x\hat{x} + k_y\hat{y} + k_{z,e}^\pm\hat{z} \tag{0}$$

The unit vector $\hat{z}''$ is the optical axis:

$$\hat{z}'' = -\sin\alpha\cos\beta\hat{x} - \sin\alpha\sin\beta\hat{y} + \cos\alpha\hat{z} \tag{0}$$

In a multi-layered formation with horizontal interfaces $z_1, z_2, \ldots z_M$, the electric field in layer m (bounded by $z_{m-1}$ and $z_m$) may be expressed as:

$$E_m(r) = \tag{0}$$

$$\int_{-\infty}^\infty \int_{-\infty}^\infty dk_x dk_y [(\hat{h}_{o,m}^\pm, \hat{h}_{e,m}^\pm) + (\hat{h}_{o,m}^\mp, \hat{h}_{e,m}^\mp) Q_m^\pm(z)] \times u_m^\pm(z) e^{ik_s \cdot (r_s - r'_s)}$$

The incident wave $u_m^\pm$ and $\overline{Q}_m^\pm$ may be found by matching continuity conditions across bed boundaries, which yields the expressions:

$$\overline{Q}_{(m)\pm}^\pm = \overline{R}_{m,m\pm1} + \overline{T}_{m\pm1,m} \overline{Q}_{(m\pm1)\mp}^\pm [I - \overline{R}_{m\pm1,m} \overline{Q}_{(m\pm1)\mp}^\pm]^{-1} \overline{T}_{m,m\pm1} \tag{0}$$

$$u_{(m\pm1)\mp}^\pm = [I - \overline{R}_{m\pm1,m} \overline{Q}_{(m\pm1)\mp}^\pm]^{-1} \overline{T}_{m,m\pm1} u_{(m)\pm}^\pm \tag{0}$$

In the above, $\overline{R}_{m,m\pm1}$ and $\overline{T}_{m,m\pm1}$ are the local reflection and transmission matrices, respectively, between layer m and m±1, and may be found by matching boundary conditions. Notations (m)+ and (m)− designate upper and lower boundaries, respectively, of layer m. The first two terms in Eq. (0), that is, $[I - \overline{R}_{m-1,m} \overline{Q}_{(m\pm1)\mp}^\pm]^{-1} \overline{T}_{m,m\pm1}$, are the so called generalized transmission matrix. The reflection and transmission matrices are each a full 2×2 matrix, suggesting that the ordinary and extraordinary modes are coupled in crossbedded formations.

In layer S, or the source layer, the following may be observed:

$$u_s^+(z) = e^{iK_z^+(z-z')} b_{\eta,0,s}^+ + e^{iK_z^+(z-z_{s-1})} v_{(s)-}^+ \tag{0}$$

$$u_s^-(z) = e^{iK_z^-(z-z')} b_{\eta,0,s}^- + e^{iK_z^-(z-z_s)} v_{(s)+}^- \tag{0}$$

where:

$$v_{(s)-}^+ = \tag{0}$$
$$[I - \overline{Q}_{(s)-}^- e^{-iK_{z,s}h_s} \overline{Q}_{(s)+}^+ e^{+iK_{z,s}^+ h_s}]^{-1} \overline{Q}_{(s)-}^- \times [b_{\eta,(s)-}^- + e^{-iK_{z,s}h_s} \overline{Q}_{(s)+}^+ b_{\eta,(s)+}^+]$$

$$v_{(s)+}^- = \tag{0}$$
$$[I - \overline{Q}_{(s)+}^+ e^{+iK_{z,s}^+ h_s} \overline{Q}_{(s)-}^- e^{-iK_{z,s}h_s}]^{-1} \overline{Q}_{(s)+}^+ \times [b_{\eta,(s)+}^+ + e^{+iK_{z,s}^+ h_s} \overline{Q}_{(s)-}^- b_{\eta,(s)-}^-]$$

In the above expressions, $h_s$ is the thickness of the source layer, $h_s = z_s - z_{s-1}$. Accordingly, with Eqs. (0),–(0) and the knowledge of $\overline{Q}_1^- = 0$ and $\overline{Q}_{M+1}^+ = 0$, the values of $u_m^\pm$ and $\overline{Q}_m^\pm$ in each of the layers may be found recursively.

The 2D integral in Eq. (0) may be evaluated in the cylindrical coordinates of wave number k. For a field point in the xz-plane:

$$E_m(r) = \int_0^\infty k_\rho dk_\rho \int_0^{2\pi} d\phi_k E_m(k_\rho, \phi_k; z, z') e^{ik_\rho L \sin\theta \cos\phi_k} \tag{0}$$

where L is the spacing between the source and the field point; $\theta$ is the bedding dip; $\phi_k$ is the angle made by $k_s$ and the $k_x$ axis. The integral over $\phi_k$ may be evaluated with the Gauss quadrature. The resultant 1D integral over $k_\rho$ may be treated with an empirical method. After the electric field is found with Eq. (0), the magnetic field may be obtained directly using Faraday's law. Once the electromagnetic field is found in the bedding coordinates, it can be converted to tool or borehole coordinates with methods known in the art.

Figure 8:
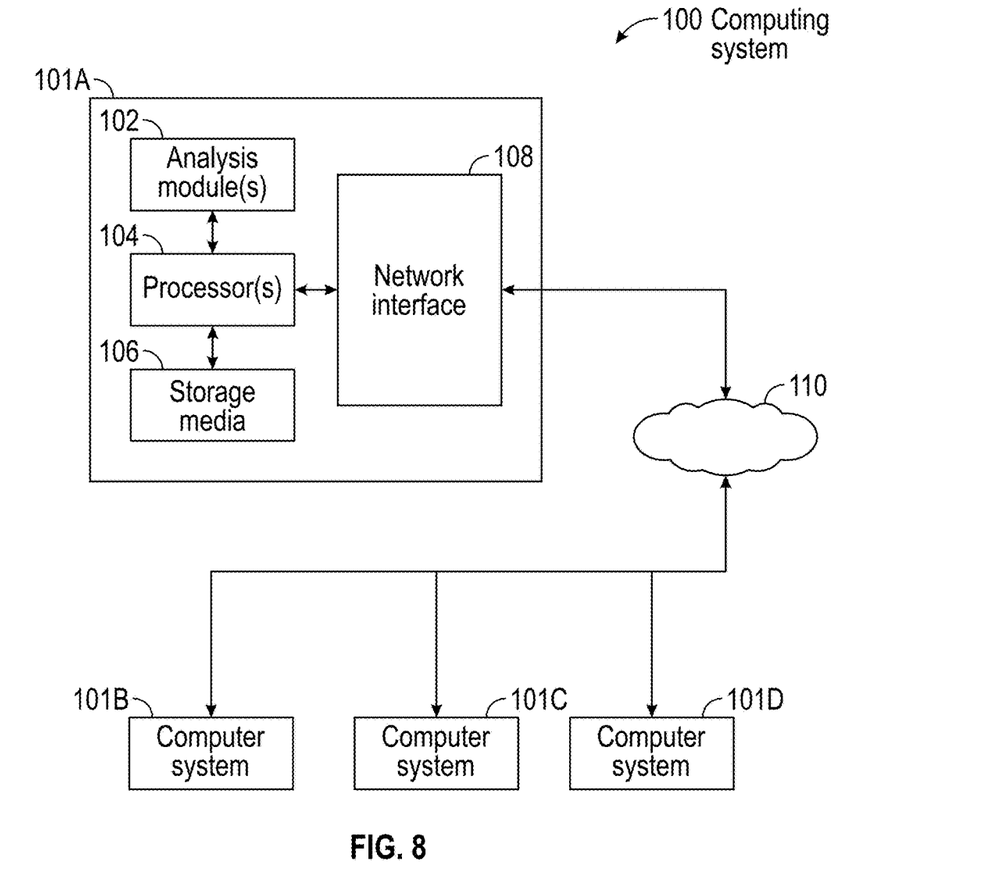
FIG. 8 shows an example computing system that may be used in some embodiments.

Generally, a method according to the present disclosure for evaluating subsurface formations may include the following actions. Measurements of multiaxial transimpedance resulting from inducing a multiaxial electromagnetic field are input to a computer system (FIG. 8). The measurements may be made at a plurality of axial spacings from a position of the inducing. An initial model of the formations may be constructed from the measurements. The initial model may comprise values of vertical resistivity, horizontal resistivity, crossbed dip, crossbed azimuth, and bedding dip and azimuth. In the computer, expected transimpedance responses due to the initial model are calculated. In the computer, the input measurements made at a plurality of axial spacings from a position of the inducing are compared to the expected transimpedance responses to calculate a difference therebetween. The initial model is adjusted, the difference between the input measurements and the expected transimpedance is recalculated, and the foregoing are repeated until the difference falls below a selected threshold. At that time, the adjusted model may be displayed.

Figure 7:
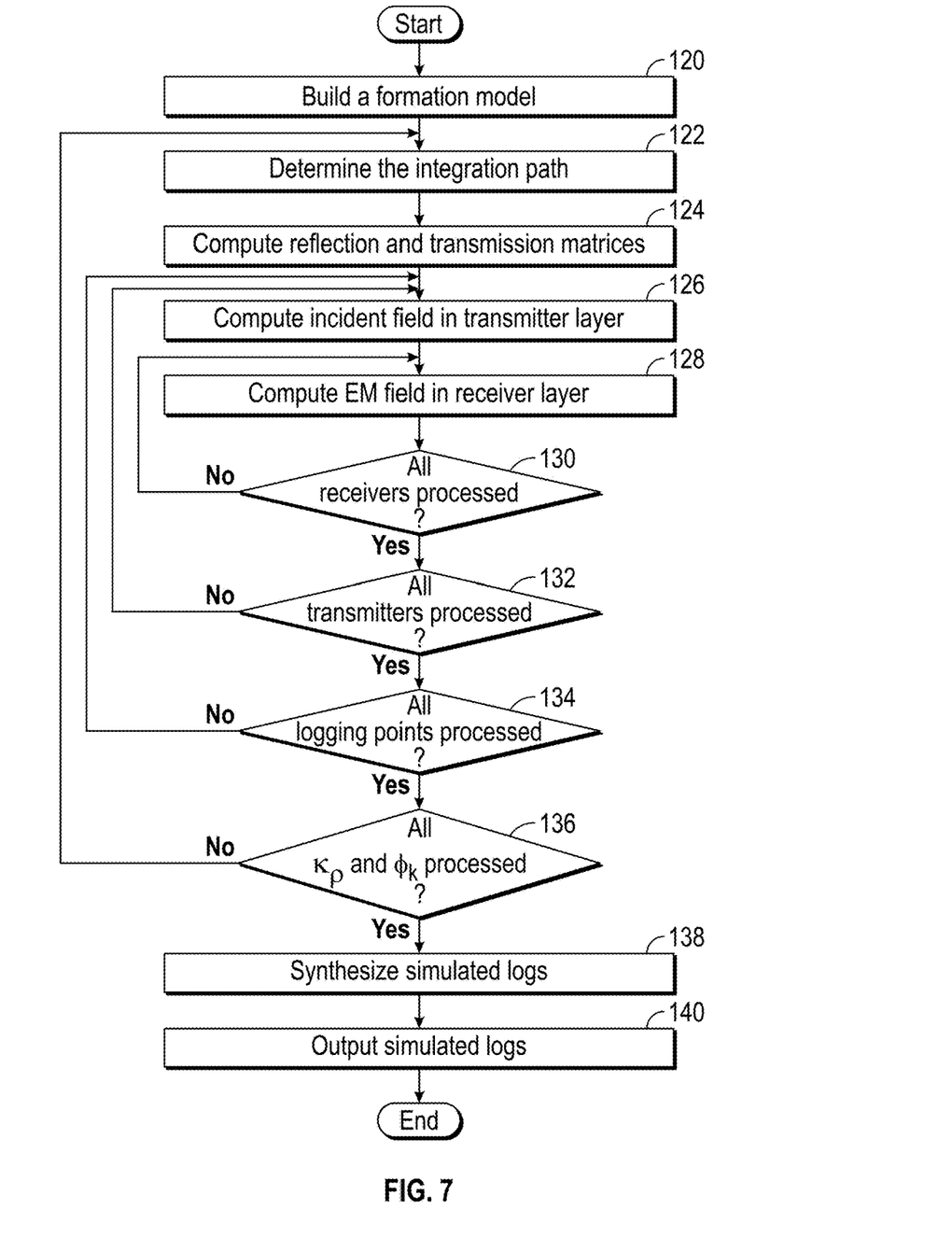
FIG. 7 is a flow chart of an example method according to the present disclosure.

A flow chart of an example implementation is shown in FIG. 7. At 120 and initial model of subsurface formations may be made, for example, using measurements made using the RT SCANNER instrument described above. Measurements from the foregoing instrument may be processed using methods known in the art to obtain initial estimates, with respect to depth, of resistivities Rh, Rv (or their inverses, conductivities σh, σv), crossbed dip and azimuth, and the bedding dip and azimuth of the formations. Non-limiting example methods for such computation as described in U.S. Pat. No. 6,798,208 B2 issued to Omeragic, U.S. Pat. No. 6,924,646 B2 issued to Omeragic and U.S. Pat. No. 6,937,021 B2 issued to Rosthal. At 122 an integration path may be determined. Decomposition of the measurements into ordinary and extraordinary components, as explained with reference to Eqs. (5) and (10) to (16) above may be performed as calculating reflection and transmission matrices from the 9-component tensor measurements described above, at 124. At 126, an incident electromagnetic field in the formation layer in which the transmitter (see FIG. 2) is disposed may be calculated. The total electromagnetic field in the layer in which each receiver (see FIG. 2) is disposed may be calculated with the ordinary and extraordinary components at 128. At 130, if all the receiver responses have been so calculated, the process may proceed to 132, wherein if the electromagnetic field of all the transmitter(s) have been calculated, the program may then proceed to 134. At 134, if all measurement points (measurements made at each axial measurement position along the wellbore) have been calculated, the process may proceed to 136. At 136, if all values of $k_p$ and Ø have been calculated, synthesized well logs may be generated at 138 wherein the electromagnetic field in the bedding coordinates may be transformed to the tool or borehole coordinates and then converted to apparent conductivity. At 140, a display or other form of output of the well logs may be generated.

2. Numerical Examples

As discussed above with respect to the example triaxial coil antenna configuration shown in FIG. 2, the transimpedance voltages measured by the instrument are a function of formation conductivity. Accordingly, they may be calibrated to an apparent conductivity tensor as follows:

$$\bar{\sigma}_a = \begin{pmatrix} \sigma_{a,xx} & \sigma_{a,xy} & \sigma_{a,xz} \\ \sigma_{a,yx} & \sigma_{a,yy} & \sigma_{a,yz} \\ \sigma_{a,zx} & \sigma_{a,zy} & \sigma_{a,zz} \end{pmatrix} \quad (0)$$

In the examples described herein, it has been assumed that the frequency of the triaxial coil antenna arrangement of FIG. 2 is 26 kHz, and that the spacings from the transmitter to the main and the bucking (balancing) receivers are 72 and 54 inches, respectively. The method described herein may be used to find the apparent conductivity to be measured by the instrument. The method will be compared herein against two existing prior methods, referred to as XBED (see, Anderson, B. I., T. D. Barber, and S. C. Gianzero, 1998, The effect of crossbedding anisotropy on induction tool response: Transactions of the SPWLA 39$^{th}$ Annual Logging Symposium, Paper B) and MAXANIS (see Davydycheva at al., *An Efficient Finite-Difference Scheme For Electromagnetic Logging in* 3D *Anisotropic Inhomogeneous Media*, Geophysics, vol. 68, pp. 1525-1536).

As a first example, consider a two-layer formation traversed by a vertical well (bedding dip θ and azimuth ϕ are 0°). The horizontal and vertical resistivity $R_h$ and $R_v$, and crossbed dip and azimuth α and β are given in TABLE 1.

TABLE 1

| PARAMETERS OF THE 2-LAYER FORMATION (Θ = Φ = 0°). | | | | | |
|---|---|---|---|---|---|
| | $R_h$ (ohm · m) | $R_v$ (ohm · m) | α | β | Thickness (ft) |
| Bed 1 | 0.1 | 0.5 | 10° | 50° | Infinity |
| Bed 2 | 1000 | 2000 | 45° | 120° | Infinity |

Figure 5:
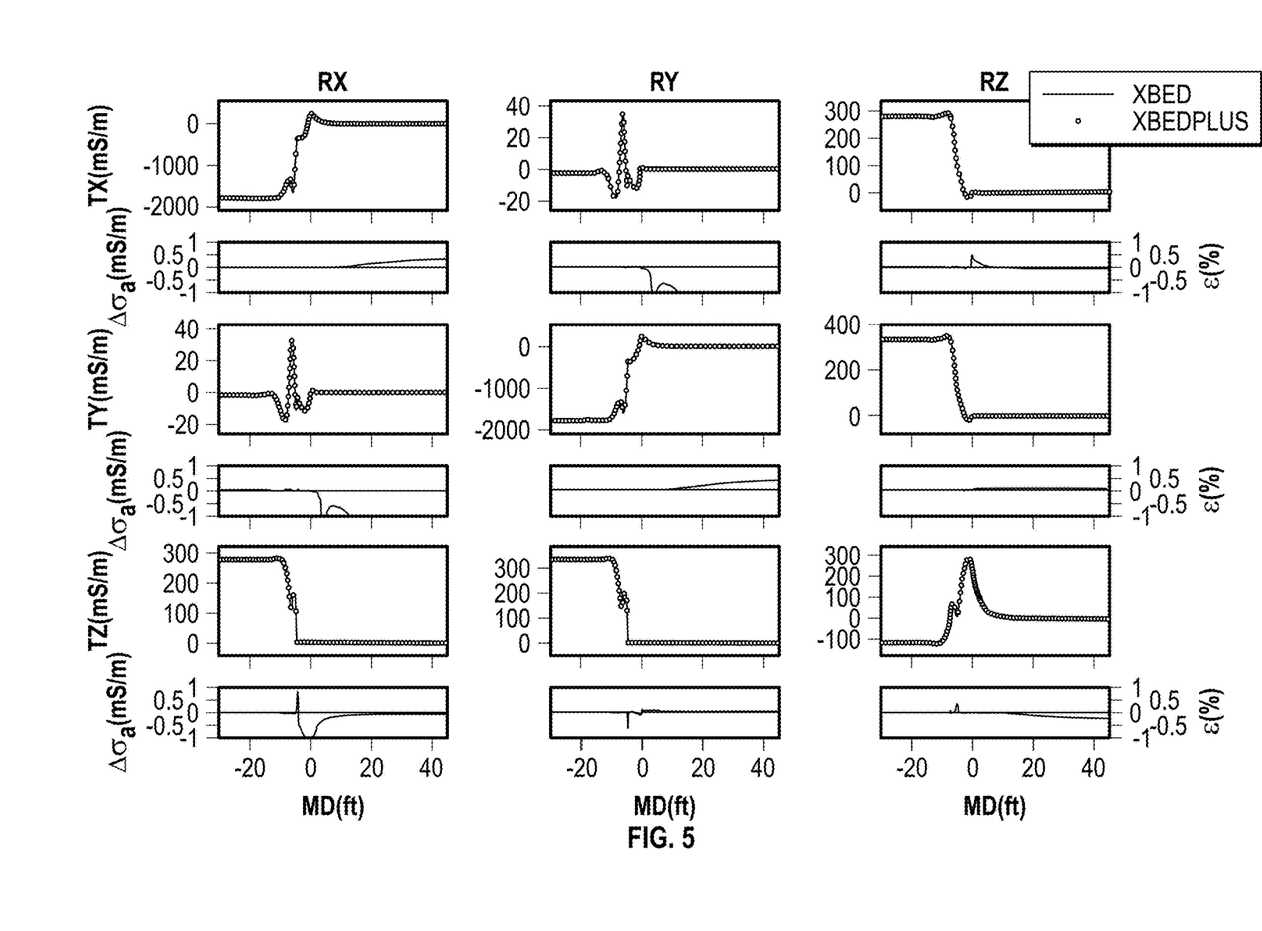
FIG. 5 shows apparent conductivity for each transmitter and receiver component pairing of a triaxial induction tool in a 2-layer horizontal formation. The lines are computed with XBED, and the circles are computed with XBEDPLUS.

The nine apparent conductivity measurements of the triaxial transmitter and receiver arrangement shown in FIG. 2 as computed with the methodology according to the present disclosure (referred to as XBEDPLUS) are shown as circles in FIG. 5 (noting that this figure depicts just the real parts (not the imaginary) due to the space limits). Also plotted as lines in FIG. 5 are nine apparent conductivity logs computed using the XBED method mentioned above. It can be observed that the two sets of results are generally in agreement with each other.

Shown below each subplot are the absolute difference (Δσα) and relative difference (ϕ) between XBEDPLUS and XBED calculations. Either of the differences being small suggests that the two methods generally match well each other. Both of them being large indicates a large discrepancy. Overall, it can be observed that the absolute difference between the two curves is fairly small, i.e., less than 0.1 mS/m in the presented examples. At some places, the relative difference can be large because of very small signal magnitude.

Figure 6:
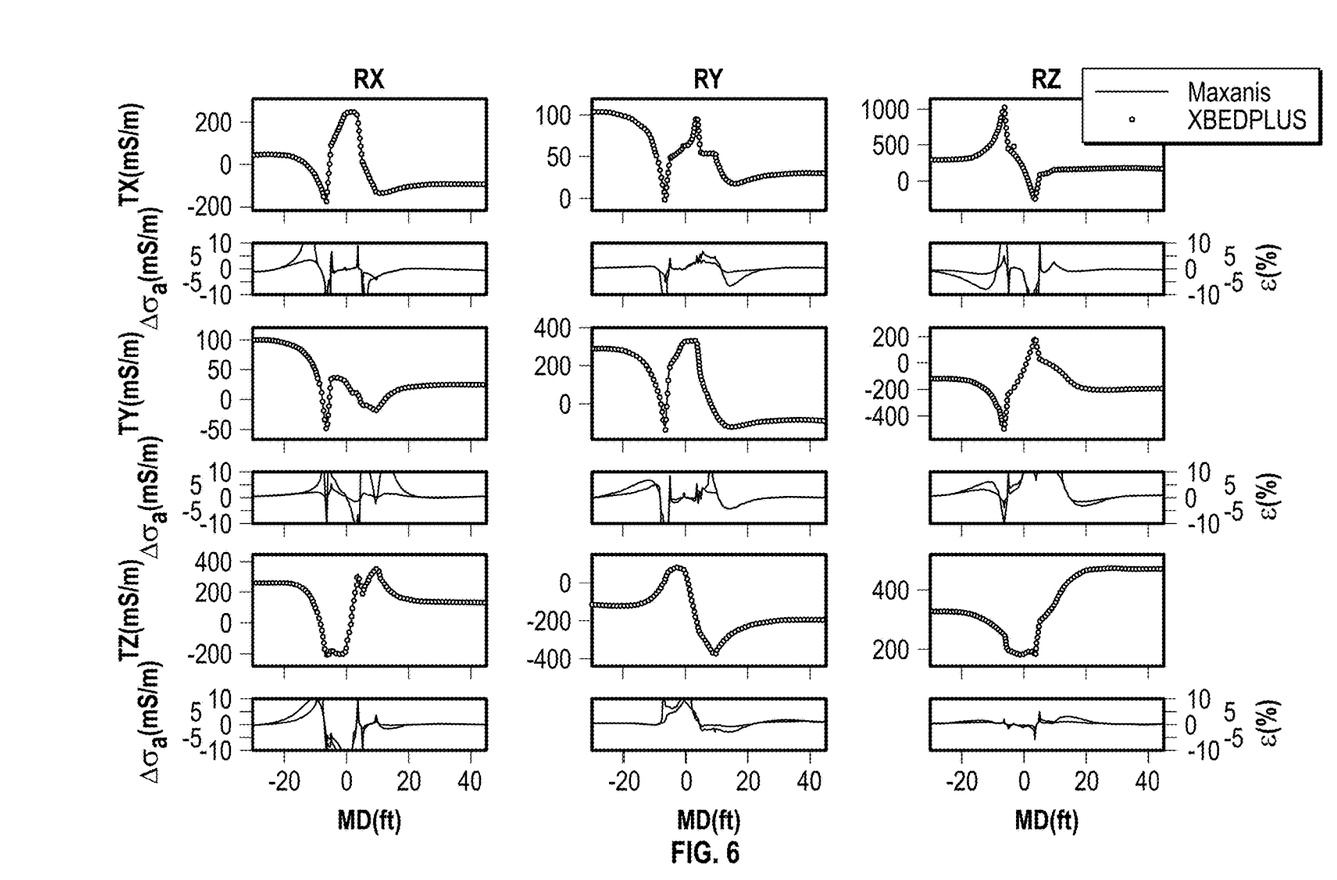
FIG. 6 shows apparent conductivity for each transmitter and receiver component pairing of a triaxial induction tool in a 3-layer formation with a bedding dip of 60°. The lines are computed with MAXANIS, and the green circles are computed with XBEDPLUS.

FIG. 6 shows the apparent conductivity in an example 3-layer formation with the bedding dip θ and azimuth ϕ being 60° and 150° respectively. The $R_h$ and $R_v$, and crossbed dip and azimuth α and β are summarized in TABLE 2.

TABLE 2

| PARAMETERS OF THE 3-LAYER FORMATION (Θ = 60°, Φ = 150°) | | | | | |
|---|---|---|---|---|---|
| | $R_h$ (ohm · m) | $R_v$ (ohm · m) | α | β | Thickness (ft) |
| Bed 1 | 1 | 5 | 10° | 50° | Infinity |
| Bed 2 | 10 | 50 | 45° | 120° | 10 |
| Bed 3 | 1 | 5 | 30° | 200° | Infinity |

The apparent conductivity measurements computed with the present method (again referred to as XBEDPLUS) are shown as circles, and those with MAXANIS are shown as lines.

Again, the overall agreement between the two methods is reasonably good considering that one method is analytical, and the other is numerical. Indeed, relatively large absolute and relative differences can be observed simultaneously on some logs around bed boundaries, e.g. $\sigma_{a,xz}$. A possible reason for the large discrepancy is the inadequacy of the underlying material averaging scheme in the existing prior method (MAXANIS) (see, Davydycheva, S., V. Druskin, and T. Habashy, 2003, *An efficient finite-difference scheme for electromagnetic logging in 3D anisotropic inhomogeneous media*. Geophysics, 68, 1525-1536) proximate the two bed boundaries. When crossbedding develops at one or both sides of an interface, the optical axis/axes are not in line with the normal to the interface. As a result, using MAXANIS, the normal is probably not the optical axis direction.

In summary, the present disclosure provides a new method to simulate the response of triaxial induction and/or electromagnetic propagation instruments in multi-layered formations in the presence of crossbedding. The new methodology allows the user to study the instrument response in both vertical wells and deviated wells. Moreover, because there is no repetitive computation for reflection and transmission matrices, the new methodology is more efficient than the existing methods reported in the literature e.g., XBED (Anderson et al. 1998) and MAXANIS (Davydycheva et al. 2003). The new methodology has been tested in a variety of typical environments. The results generally show that it is in agreement with an existing analytical method in vertical wells. In deviated wells, the comparison is also shows close agreement.

As will be understood, the various techniques described above and relating to obtaining/processing electromagnetic measurements are provided as example embodiments. Accordingly, it should be understood that the present disclosure should not be construed as being limited to just the examples provided above. Further, it should be appreciated that the techniques disclosed herein may be implemented in any suitable manner, including hardware (suitably configured circuitry), software (e.g., via a computer program including executable code stored on one or more tangible non-transitory computer readable medium), or via using a combination of both hardware and software elements. Further, it is understood that the various techniques described may be implemented on a wellbore instrument processor (e.g., a processor that is part of a well logging instrument), with the results transmitted to the surface by any suitable telemetry technique. Additionally, in other embodiments, data may be transmitted to the surface via telemetry, and the processing of measurements may be performed at the surface on a surface computer (e.g., part of the logging and control system 70 shown in FIG. 3).

FIG. 8 shows an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks described above. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, e.g., in the surface control unit 70 in FIG. 1, while in communication with one or more computer systems such as 101C and/or 101D that may be located in one or more data centers on shore, aboard ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 8 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 8, and/or computing system 100 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

What is claimed is:

1. A method for determining a crossbed dip and a cross bed azimuth of a crossbedded subsurface formation, the method comprising:

deploying an electromagnetic well logging tool in a wellbore penetrating a crossbedded subsurface formation, the logging tool including a multi-axial transmitter and a plurality of multi-axial receivers longitudinally spaced from the multi-axial transmitter;

applying electrical currents to the multi-axial transmitter to transmit corresponding multi-axial electromagnetic waves into the crossbedded subsurface formation;

causing the multi-axial receivers to measure induced transimpedance coupling voltages corresponding to each of said transmitted multi-axial electromagnetic waves;

receiving said measured transimpedance coupling voltages in a computer;

generating an initial model of the subsurface formation from the said measured transimpedance coupling voltages, the model comprising values of vertical resistivity, horizontal resistivity, crossbed dip, crossbed azimuth, bedding dip, and bedding azimuth;

in the computer, calculating expected transimpedance coupling voltages from the initial model;

in the computer, comparing said measured transimpedance coupling voltages with the expected transimpedance coupling voltages to calculate a difference therebetween;

in the computer, adjusting the initial model and recalculating the expected transimpedance voltages, and repeating the adjusting, recalculating and comparing until the difference falls below a selected threshold to compute at least the crossbed dip and the crossbed azimuth of the subsurface formation; and displaying the adjusted model.

2. The method of claim 1 wherein said measured transimpedance coupling voltages comprise triaxial electromagnetic induction measurements.

3. The method of claim 2 wherein:
the plurality of multi-axial electromagnetic receivers comprises a plurality electromagnetic triaxial receivers; and
the triaxial induction measurements are made by measuring induced voltages in each coil of the plurality of electromagnetic triaxial receivers.

4. The method of claim 1 wherein:
the plurality of multi-axial receivers comprises a plurality of tri-axial receivers; and
said measured transimpedance coupling voltages are made by measuring at least one of a phase shift and an amplitude attenuation in the plurality of triaxial receivers.

5. The method of claim 1 wherein the calculating the expected transimpedance coupling voltages comprises decomposing a calculated electromagnetic field.

6. The method of claim 5 wherein the decomposing comprises splitting an electromagnetic field into ordinary and extraordinary modes; computing reflection and transmission matrices; computing an incident electromagnetic field in a formation layer in which the position of inducing the electromagnetic field is performed; and computing an electromagnetic field in which the multiaxial receivers measure the induced transimpedance voltages.

7. A method for well logging a crossbedded subsurface formation, the method comprising:
moving an electromagnetic well logging instrument in a wellbore penetrating a crossbedded subsurface formation, the logging instrument including at least one multiaxial electromagnetic transmitter and a plurality of multi-axial electromagnetic receivers longitudinally spaced apart from the multi-axial transmitter;

applying electrical currents to the multi-axial transmitter to transmit corresponding multi-axial electromagnetic waves into the crossbedded subsurface formation while moving the logging instrument;

causing the multi-axial receivers to measure induced transimpedance coupling voltages corresponding to each of said transmitted multi-axial electromagnetic waves;

receiving said measured transimpedance coupling voltages in a computer;

generating an initial model of the formation from said measured transimpedance coupling voltages, the model comprising values of vertical resistivity, horizontal resistivity, crossbed dip, crossbed azimuth, and bedding dip, and bedding azimuth;

in the computer, calculating transimpedance coupling voltages from the initial model;

in the computer, comparing said measured transimpedance coupling voltages with the expected transimpedance coupling voltages to calculate a difference therebetween;

in the computer, adjusting the initial model and recalculating the expected transimpedance coupling voltages, and repeating the adjusting, recalculating and comparing until the difference falls below a selected threshold to compute at least the crossbed dip and the crossbed azimuth of the subsurface formation; and displaying the adjusted model.

8. The method of claim 7 wherein said measured transimpedance coupling voltages comprise triaxial electromagnetic induction measurements.

9. The method of claim 8 wherein:
the plurality of multi-axial electromagnetic receivers comprises a plurality electromagnetic triaxial receivers; and
the triaxial induction measurements are made by measuring induced voltages in each coil of the plurality of electromagnetic triaxial receivers.

10. The method of claim 7 wherein:
the plurality of multi-axial receivers comprise a plurality of triaxial receivers; and
said measured transimpedance coupling voltages are made by measuring at least one of a phase shift and an amplitude attenuation in the plurality of triaxial receivers.

11. The method of claim 7 wherein the calculating the expected transimpedance coupling voltages comprises decomposing a calculated electromagnetic field.

12. The method of claim 11 wherein the decomposing comprises splitting an electromagnetic field into ordinary and extraordinary modes; computing reflection and transmission matrices; computing an incident electromagnetic field in a formation layer in which the position of inducing the electromagnetic field is performed; and computing an electromagnetic field in which the multi-axial receivers measure the induced transimpedance voltages.

13. A system for logging a well that penetrates a crossbedded subsurface formation, the system, comprising:
an electromagnetic well logging instrument having at least one multi-axial electromagnetic transmitter and a plurality of spaced apart multi-axial electromagnetic receivers spaced apart from the transmitter;
means for applying electrical currents to the at least one multi-axial electromagnetic transmitter to transmit corresponding multi-axial electromagnetic waves into the crossbedded subsurface formation;

means for measuring induced transimpedance coupling voltages corresponding to each of said transmitted multi-axial electromagnetic waves in each of the plurality of multi-axial electromagnetic receivers; and a computer processor having instructions programmed thereon to perform actions comprising:
(i) receiving said measured transimpedance coupling voltages as input to the processor,
(ii) generating an initial model of the formations from said measured transimpedance coupling voltages, the model comprising values of vertical resistivity, horizontal resistivity, crossbed dip, crossbed azimuth, and bedding dip, and bedding azimuth,
(iii) calculating expected transimpedance coupling voltages from the initial model,
(iv) comparing said measured transimpedance coupling voltages to the expected transimpedance coupling voltages to calculate a difference therebetween,
(v) adjusting the initial model and recalculating the difference until the difference falls below a selected threshold to compute at least the crossbed dip and the crossbed azimuth of the subsurface formation, and
(vi) displaying the adjusted model.

14. The system of claim 13 wherein said measured transimpedance coupling voltages comprise triaxial electromagnetic induction measurements.

15. The system of claim 14 wherein the at least one multi-axial electromagnetic transmitter comprises at least one triaxial electromagnetic transmitter and the plurality of multiaxial electromagnetic receivers comprise a plurality of triaxial receivers.

16. The system of claim 13 wherein the wherein:
the plurality of multi-axial receivers comprise a plurality of tri-axial receivers; and
the means for measuring said measured transimpedance coupling voltages comprise means for measuring phase shift and amplitude attenuation in the plurality of triaxial receivers.

17. The system of claim 13 wherein the processor further comprises programmed instructions to decompose the expected transimpedance coupling voltages.

18. The system of claim 17 wherein the decomposing comprises splitting an electromagnetic field into ordinary and extraordinary modes; computing reflection and transmission matrices; computing an incident electromagnetic field in a formation layer in which the position of inducing the electromagnetic field is performed; and computing an electromagnetic field in which the multi-axial receivers measure the induced transimpedance voltages.

* * * * *